July 19, 1949.　　　C. H. WILLIS　　　2,476,790
CONTROL CIRCUIT FOR GAS TUBES
Filed Oct. 16, 1948
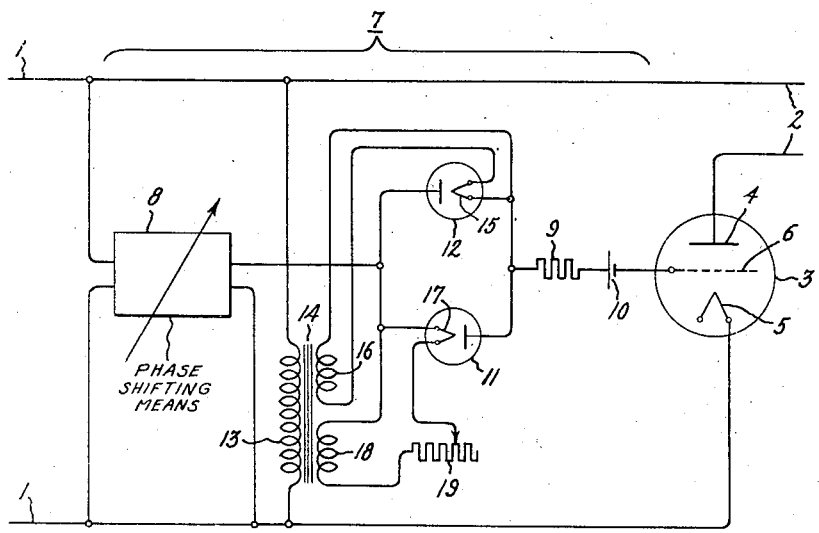
Inventor:
Clodius H. Willis,
by　*Crowell S. Mack*
His Attorney.

Patented July 19, 1949

2,476,790

UNITED STATES PATENT OFFICE 2,476,790

CONTROL CIRCUIT FOR GAS TUBES

Clodius H. Willis, Princeton, N. J., assignor to General Electric Company, a corporation of New York Application October 16, 1948, Serial No. 54,978

2 Claims. (Cl. 315—246)

My invention relates to electric valve circuits, and more particularly to protective circuits for vapor electric valves of the type having an anode, a cathode, and one or more control electrodes, to prevent loss of control of the valves by the control electrodes.

In electric converting systems, use is frequently made of vapor electric valves of the type having an anode, a cathode, and one or more control electrodes. A valve of such type is rendered conductive by means of the control electrode and an associated excitation circuit when the potentials of the control electrode and the anode are positive relative to the potential of the cathode. Said valve is rendered non-conductive when the potential of the anode is negative relative to the potential of the cathode. It is well known that when the control electrode is subjected to bombardment by positive ions during the deionization period of the valve after conduction, a "cathode spot" occasionally forms on the electrode, causing the electrode to become, in effect, a cathode emitter, and causing thereby loss of the electrode as a controlling means in the system. It is also well known that bombardment of the electrode by positive ions will not result in a cathode spot unless the electrode current corresponding to such bombardment is relatively large. If, therefore, current limiting means is included in the electrode circuit and is made to limit the electrode current during the period of positive ion bombardment of the electrode, and non-limiting means is included in the electrode circuit to permit the flow of normal electrode current in the opposite direction during the period of normal conduction by the valve, the formation of cathode spots on the electrode will be prevented, and the control electrode will perform its normal function.

Accordingly, it is the object of my invention to provide a new and improved protective means to prevent loss of control by the control electrodes in vapor electric valves due to the formation of cathode spots on such electrodes.

For a better understanding of my invention, attention is directed to the following description and accompanying drawing, and also to the appended claims in which the features of the invention believed to be novel are set forth.

In the accompanying drawings there is illustrated an embodiment of my invention comprising a half-wave rectifying system for transmitting energy from an alternating current circuit 1 to a direct current circuit 2 having one conductor common to the circuit 1 by means of a vapor electric device or valve 3 having an anode 4, a cathode 5, and a control electrode 6. The device as illustrated has its cathode 5 connected to the other conductor of the circuit 1 and its anode 4 connected to the corresponding conductor of the circuit 2. The conductivity of the vapor electric valve 3 may be controlled by means of a control electrode 6 and any conventional excitation or control circuit such as the excitation circuit 7 including a conventional phase shifting means 8 such as a rotary phase shifter, a current-limiting resistance 9, and any suitable source of biasing potential such as a battery 10.

A pair of reversely-paralleled unidirectional conducting devices 11 and 12 is incorporated in the excitation circuit 7 in series relation with the control electrode 6. The unidirectional conducting device 11 is of limited current-carrying capacity and is preferably a diode of the type having temperature-limited emission. The unidirectional conductor 12 is preferably a diode of current-carrying capacity adequate to conduct the current permitted to flow in the excitation circuit 7 by the current-limiting resistance 9. The primary winding 13 of a transformer 14 is connected to the terminals of the alternating current circuit 1. The cathode 15 of diode 12 is provided with heating current by secondary winding 16 of transformer 14. The cathode 17 of diode 11 is provided with heating current by secondary winding 18 of transformer 14. The value of heating current and the level of emission by the cathode 17 is adjustable by means of a variable resistance 19 to control the current capacity of the diode 11.

In operation the vapor electric valve 3 is rendered conductive, as will be understood by those skilled in the art, by means of the excitation circuit 7 and the control electrode 6. During that portion of the alternating current cycle when the potentials of the control electrode 6 and the anode 4 are positive relative to the potential of the cathode 5, the vapor electric valve 3 is rendered conductive. Under this condition the control electrode 6 is subjected to bombardment by electrons and a current flows toward the control electrode 6 from the excitation circuit 7. In particular the current is not allowed to flow through the diode 11 because of its unidirectional conducting property, but is allowed to flow substantially unhindered through the diode 12. During the other portion of the alternating current cycle when the potential of the anode 4 is negative relative to the potential of the cathode 5, the vapor electric valve 3 is rendered non-conductive.

During the period of the deionization of the vapor electric valve 3 immediately following the period of conduction, the control electrode 6 is subjected to bombardment by positive ions and a current flows away from the control electrode 6 in the excitation circuit 7. In particular this current is not allowed to flow through the diode 12 because of its unidirectional conducting property, but is allowed to flow through the diode 11. Because of the current-limiting characteristic of the diode 11, the current in the control electrode 6 and excitation circuit 7 during this other portion of the cycle is limited to a value lower than the value required for the formation of cathode spots on the control electrode 6, and emission by the control electrode 6 and resultant loss of control of the vapor electric valve 3 are thereby prevented.

While a preferred embodiment of my invention has been described, it will be understood that various modifications can be made without departing from my invention, and it is intended, therefore, to cover in the appended claims all such changes and modifications as fall within the true spirit and scope of my invention.

What I claim as new and desire to secure by Letters Patent of the United States is:

1. In a converting circuit, an electric discharge device of the gas-filled type having an anode, a cathode, and a control electrode, means for impressing a first alternating voltage between said anode and said cathode, means for impressing a second alternating voltage on said electrode, said second voltage being arranged to control the conduction of current through said device during predetermined intervals, said electrode being subjected to ionic bombardment during the non-conductive periods of said device, and means to prevent emission by said electrode during said periods comprising a pair of parallel unidirectional paths connected in series with said electrode, said paths being poled oppositely, and the one of said paths which is conducting during said periods having a limited current conducting characteristic.

2. In a converting circuit, an electric discharge device of the gas-filled type comprising an anode, a cathode, and a control electrode, means for impressing a first alternating voltage between said anode and said cathode, means for impressing a second alternating voltage between said electrode and said cathode, said second voltage being arranged to control the conduction of current through said device during predetermined intervals, said electrode being subjected to high current flow during non-conductive periods of said device, and means to prevent emission by said electrode during said periods comprising a pair of unidirectional devices connected in parallel with each other and in series between said electrode and said cathode, said devices being poled oppositely, the one of said devices which is conductive during said periods having a current carrying capacity less than the value of current required to cause emission by said electrode.

CLODIUS H. WILLIS.

No references cited.